United States Patent Office 3,437,463
Patented Apr. 8, 1969

3,437,463
GELLED LIQUID HYDROCARBON FUELS CONTAINING ATACTIC PROPYLENE POLYMERS AND TREATED BENTONITE CLAY
Richard P. Maloney, Chester, and Wilmer E. McCorquodale, Jr., Havertown, Pa., assignors to Sun Oil Company, Philadelphia, Pa., a corporation of New Jersey
No Drawing. Continuation-in-part of application Ser. No. 590,496, Oct. 31, 1966. This application Mar. 5, 1968, Ser. No. 710,635
Int. Cl. C10l 7/02
U.S. Cl. 44—7          4 Claims

ABSTRACT OF THE DISCLOSURE

A gelled normally volatile fuel composition consisting essentially of normally liquid volatile fuel containing 10 to 50 weight percent based on the final composition of a gelling agent consisting essentially of 50 to 90 weight percent atactic polypropylene and 10 to 50 weight percent organic base-coated bentonite clay.

Cross reference to related application

The present application is a continuation-in-part of our copending application, Ser. No. 590,496, filed Oct. 31, 1966, now abandoned.

Brief summary of the invention

This invention relates to novel gelled fuel compositions of improved gel stability and improved tack properties. More particularly this invention relates to gelled fuel compositions containing a combination of atactic propylene polymers and organic base-coated bentonite clays as gelling agents for volatile combustible hydrocarbon liquids. Specifically this invention relates to stable, tacky, gelled fuel compositions particularly suitable as a fuel in firebombs, flamethrowers, and related areas of military applications.

Background of the invention

Considerable art has been developed heretofore with respect to the manufacture of gelled or thickened fuels, particularly designed for use in firebombs, flamethrowers, and related military applications. Thickening agents such as natural or synthetic rubber, metallic fatty acid soaps, and various synthetic, organic and inorganic polymers have been proposed as gelling agents for gasoline or similar normally liquid volatile hydrocarbon fuels. For example, U.S. Patents 2,445,311 and 2,606,107 propose polyisobutylene as a gelling agent. U.S. Patent 3,084,033 discloses that crystalline polypropylene is suitable for gelling liquid hydrocarbons although amorphous polypropylene is said to be unsuitable for that purpose. Recently it has been disclosed that napalm "B" which consists of 25 percent gasoline, 25 percent benzene, and 50 percent polystyrene, is presently being used as a fuel for firebombs and flamethrowers. While many of the prior art thickening agents have provided usable gelled fuel compositions, certain inherent deficiencies in each of these compositions render these compositions only fair at best.

Previous attempts to utilize atactic polypropylene as a gelling agent for normally liquid volatile hydrocarbons have been disclosed to be unsuccessful. Effective use of atactic random and terminal block propylene-ethylene copolymers as gelling agents for normally liquid hydrocarbon fuels has been disclosed in copending U.S. patent application Ser. No. 599,974 filed Oct. 31, 1966, now abandoned.

Also cross-linked atactic propylene polymers have been disclosed as gelling agents for normally liquid volatile hydrocarbons in copending U.S. patent application Ser. No. 590,497 filed Oct. 31, 1966, now abandoned.

Description of the invention

It has now been discovered that unmodified atactic polypropylene can be effectively used to gel liquid hydrocarbons when the polymer is combined with organic base-coated bentonite clay.

It has also been discovered that gelled normally liquid volatile hydrocarbon fuels to which organic base-coated bentonite clay has been added provides an improved composition containing substantially less polymer than a similar gelled hydrocarbon composition without the bentonite clay.

The invention thus provides novel thickened fuel compositions containing, as the essential thickening agent components, both atactic propylene polymer and a bentonite which has been treated with an organic base. These compositions, unlike conventional fuel compositions thickened with soaps, are insensitive to moisture and have better gel stability and improved tack properties. These compositions can contain smaller proportions of the polymer component than would otherwise be possible in the absence of the treated bentonite for securing the same degree of thickening.

In accordance with the invention, normally liquid hydrocarbons either individually or as mixtures can be thickened to form viscous tacky gelled fuel compositions particularly suitable for firebomb and flamethrower fuel applications by incorporation in a normally liquid hydrocarbon a minor proportion of a novel gelling agent. This gelling agent is composed of a mixture of atactic propylene polymer and organic base-coated bentonite clay. It has been discovered that by the addition of organic base-coated benotnite clay to the atactic propylene polymers, a gelling composition capable of gelling large volumes of normally liquid hydrocarbons and requiring only a small amount of polymer in the finished gelled liquid hydrocarbon composition can be recovered.

Preferred compositions of the invention are made by incorporating into the normally liquid hydrocarbon the gelling agent, including both of the specified components, in amount of 10-50% by weight based on the final composition. The gelling agent itself can be composed of 10-50% of the treated bentonite and 50-90% of the atactic propylene polymer by weight.

By the term atactic propylene polymers as disclosed herein is meant the substantially solid amorphous fraction of polymer recovered from the stereospecific polymerization of propylene or mixtures of propylene and ethylene wherein the major amount of polymerized monomer in the product is propylene. This polymer fraction is generally known in the art as the atactic fraction recovered as a by-product from the low pressure stereospecific polymerization process used in making crystalline polypropylene. Stereospecific polymerization procedures are well known to those skilled in the art. Examples of this type of process are disclosed in Belgian Patent 538,782, and British Patent 994,416, as well as many others. Atactic propylene polymers are generally characterized as solid amorphous polymers having a molecular weight in the range of 1000–300,000, as measured by intrinsic viscosity in decalin at 275° F., and a density in the range of 0.82 to 0.91.

In the process the polymers are prepared by polymerizing the constituent monomers in the desired proportions with the aid of certain polymerization catalysts, e.g., see above-mentioned Belgian patent. The catalysts are solid, insoluble, reaction products obtained by partially reducing a reducible, heavy, transition halide of a Group IVb or VIb or VIII metal with a reducing Group I and III metal-containing material such as an organometallic compound of an alkali, alkaline earth, rare earth metal or zinc.

They can also be advantageously prepared by reducing an appropriate metal compound with the aid of metallic aluminum or a mixture of aluminum and tatanium, etc. A catalyst of this type can thus be prepared, for example, by reducing 1 mole of titanium tetrahalide, usually tetrachloride, to the corresponding trivalent or subtrivalent titanium halide with about 0.2 to 6 moles of aluminum triethyl, triisobutyl, or other aluminum alkyl compound of the formula RR'AlX. In this formula R, R', and X can comprise alkyl groups and which can alternatively be hydrogen or a halogen, notably chlorine. The reducing is carried out by dissolving each of the two catalyst components in an inert solvent, preferably a $C_3$ to $C_{18}$ paraffin such as isopentane or n-heptane, and mixing the two solutions in the proper proportions at temperatures between 0° and 300° F. and in the absence of moisture, oxygen and sulfur impurities. The resulting precipitate in conjunction with some free aluminum alkyl compound is generally considered to constitute the actual active polymerization catalyst. Other organic and metallo-organic coordinators such as tetra ethoxy-silane or the dimethyl ethers of polyethylene glycol can also be added to form the coordinated complex catalysts unsable for alpha-olefin polymerizations. Alternatively, it is possible to carry out the catalyst preparation using only about 0.3 to 0.8 mole of the aluminum alkyl compound per mole of titanium chloride, and then add a supplemental amount of the aluminum alkyl compound to the polymerization zone to raise the Al/Ti mole ratio therein to a value between about 1:1 and 3:1.

The monomers are then contacted with the resulting catalyst in the presence of inert hydrocarbon solvents. The hydrocarbon solvents that have been shown to be particularly useful for this purpose and particularly for propylene polymerizations include hexane and heptane.

The polymerization is conveniently effected at temperatures of about 100 to 250° F., and pressures ranging from about 0 to 500 p.s.i.g., usually 0 to 100 p.s.i.g. The catalyst concentration in the polymerization zone is preferably in the range of about 0.01 to 0.5 weight percent based on total liquid and the polymer product concentration in the polymerization zone is preferably kept between about 5 to 15 weight percent based on total contents so as to allow easy handling of the polymerized mixture. The proper polymer concentration can be obtained by having enough of the inert diluent present or by controlling the polymerization short of 100% conversion.

When the desired degree of polymerization has zeen reached, a $C_1$ to $C_3$ alkanol such as methyl alcohol, ethanol, or isopropyl alcohol is normally added to the reaction mixture for the purpose of deactivating and partially dissolving the catalyst. However, other methods of catalyst deactivation well known to those skilled in the are can alternately be used.

Typical alpha-olefin polymerization products obtained from the above-disclosed methods are normally mixtures of polymers with varying molecular structures and varying molecular weights which can be fractionated by solvents, the solvent-separated fractions being polymers of different structures and different molecular weights. In the polymerization process using an inert hydrocarbon polymerization medium such as pentane, hexane, or heptane, the product obtained will be generally in a slurry and is normally partially soluble in the polymerization medium.

Generally the insoluble polymer product is recovered from the solvent containing the dissolved polymer fractions by centrifuging the slurry or by filtration or both. The recovered solid polymer product is often subsequently washed with alcohol and dried to yield a white powdery high molecular weight, highly crystalline polymer product. This polymer fraction is normally referred to as the crystalline fraction.

The remaining solvent-soluble propylene polymer fractions often referred to as the atactic fraction are composed of primarily amorphous polypropylene or propylene copolymer which are defined as polymers of a non-stereoregular structure, which polymers are not crystallizable. Also stereoblock polymer which has been described as a generally linear alpha-olefin polymer having crystallizable segments of stereoregular structure and non-crystallizable segments of irregular structure in the same molecule and crystalline polymers are present as impurities in atactic propylene polymers.

The atactic polymer can be recovered as a solid polymeric residue from the polymerization solvent by simple distillation or steam stripping. The dried polymer can then be cross-linked by blending the polymer with 0.5 to 10 weight percent of a cross-linking agent and masticating the mixture at a temperature in the range of 250° to 500° F. for a time period of from 0.1 to 10 hours. Cross-linking agents usable for cross-linking atactic propylene polymers include certain organic peroxides. These organic peroxides are those known in the art that decompose and form free radicals, upon heating. Some of the free radical generating organic peroxides which can be used to cross-link the propylene polymers of the present invention include symmetrical or bis(aralkyl) and bis(alkyl) peroxides; dibenzyl peroxide, bis($\alpha$-methylbenzyl) peroxides, bis($\alpha,\alpha$-dimethylnaphthylmethyl) peroxide, bis($\alpha,\alpha$ - dimethyl-p-methylbenzyl) peroxide, bis($\alpha,\alpha$-dimethyl-p-isopropylbenzyl) peroxide, and di-t-butyl peroxide and others.

Clays that swell at least to some extent on being contacted with water and contain as a primary constitutent a mineral of the group known as montmorillonites are generally referred to as bentonites. Such clays, which contain exchangeable alkali metal atoms either naturally or after treatment, constitute the raw materials employed in making the bentonite-organic base compounds used in the compositions of this invention. Typical bentonite-organic base compounds employed in accordance with the invention are compounds composed of a montmorillonite mineral in which at least a part of the cation content of the mineral has been replaced by an organic base.

The bentonite-organic base compounds are preferably prepared as described in U.S. Patent No. 2,033,856, issued March 10, 1936, by bringing together the bentonite and the organic base in the presence of aqueous mineral acid to effect base exchange. The organic bases should preferably be titratable with mineral acids. Among these reactive bases are many alkaloids, and cyclic, aliphatic, and heterocyclic amines. The bentonite-organic base compounds used in preparing the compositions of this invention are preferably those prepared by bringing together a bentonite clay and such organic bases as aliphatic amines, their salts, and quaternary ammonium salts. Examples of such amines and salts are: decylamine, dodecylamine, tetradecylamine, hexadecylamine, octadecylamine, hexadecyl ammonium acetate, octadecyl ammonium acetate, dimethyldioctyl ammonium acetate, dimethyldidodecyl ammonium acetate, dimethyldodecylhexadecyl ammonium acetate, dimethyldicetyl ammonium acetate, dimethylhexadecyloctadecyl ammonium acetate, dimethyldioctadecyl ammonium acetate, and the corresponding chlorides and quaternary ammonium chlorides. The organic bases employed should be such as to impart substantial organophilic properties to the resulting compounds. The preferred bentonite compounds are prepared from quaternary ammonium compounds in which the N-substituents are aliphatic groups containing at least one alkyl group with a total of at least 10 carbon atoms. When aliphatic amines are used they preferably contain at least one alkyl group containing at least 10 carbon atoms.

The liquid hydrocarbons which can be thickened in accordance with the invention include pure hydrocarbons of any structural configuration, and mixtures of any and all such types, boiling within the range of from about 80° F. to about 650° F. at atmospheric pressure. Straight- or branched-chain paraffins and olefins, cycloparaffins and aromatic hydrocarbons can thus be thickened in accordance with this invention. Non-limiting examples of such hydrocarbons are: pentane, hexane, octane, decane, isopentane, isooctane, triptane, pentene-1, 2-methylbutene-1, hexene-1, heptene-1, octene-1, cyclopentane, cyclohexane, benzene, toluene, xylene, and the like. Various fractions of naturally-existing mixtures of hydrocarbons, such as certain fractions of petroleum, can also be satisfactorily thickened in accordance with the invention. Petroleum fractions boiling within the above-stated permissible atmospheric boiling range, including gasoline, kerosine, petroleum spirits, and No. 2 furnace oil, are particularly suitable for use in making a gelled volatile liquid hydrocarbon fuel concentrate. Gasoline fractions generally comprise mixtures of hydrocarbons boiling within the range of from about 80° F. to about 440° F., at atmospheric pressure. Petroleum spirits boil in the range of 300–400° F. and kerosine has an atmospheric boiling range of from about 350° to about 550° F. No. 2 furnace oil normally boils in the range of 400 to 650° F. at atmospheric pressure. Mixtures of such petroleum fractions in any and all proportions can also be suitably thickened in accordance with this invention. However, it is preferred that mixtures of petroleum fractions which comprise a No. 2 furnace oil fraction or other high boiling fractions should contain at least 80 weight percent gasoline to provide the volatility characteristics required in most applications for thickened hydrocarbon fuels.

Gelling of volatile normally liquid hydrocarbon fuels in accordance with the invention can be equally accomplished by several procedures. One method comprises first making a dilute gel of the liquid hydrocarbon with propylene polymer, then adding the treated bentonite clay in an amount to produce the required consistency in the finished product. Alternatively, the polymer and organic base-coated bentonite clay can be first blended together and then added to the liquid hydrocarbon fuel. The preferred gelled volatile liquid hydrocarbon compositions of the present invention comprise a hydrocarbon fuel containing 20 to 40 weight percent based on the total weight of the composition of the propylene polymer-organic base-coated bentonite clay gelling agent.

As one means of illustration of the process and compositions of the present invention, the following examples are herein presented. As given hereinbelow all parts and percentages are by weight and all boiling point temperatures are at atmospheric pressure unless otherwise stated.

Example I 100 grams of typical atactic polypropylene as described hereinabove were blended with 300 grams of a narrow cut petoleum fraction characterized as boiling in the range of 300–400° F. and composed of 50 percent paraffins, 30 percent naphthenes, and 20 percent aromatics. The blend was agitated and heated to a temperature of 150° F. for 15 minutes. A tacky solution was recovered which did not have the consistency of a gel. To this solution was added 50 grams of a commercial grade of organic base-treated bentonite known as "Baragel 24" (product of Baroid Chemicals Inc., U.S.A.), a bentonite clay coated with quaternary ammonium salt.

The resulting composition was a highly viscous thickened volatile hydrocarbon fuel, readily ignitible and gel stable at any temperature in the range of −40 to +125° F. These results show that the desired thickening action was not obtained until the treated bentonite was incorporated into the composition.

Example II 50 grams of a typical terminal block propylene-ethylene copolymer containing 15 percent polymerized ethylene were blended with 600 grams of a narrow cut petroleum fraction as described in Example I. A gelled hydrocarbon fuel composition was produced. To this were added 50 grams of a treated bentonite clay ("Baragel 24") disclosed in Example I. After addition of the bentonite clay it was possible to add an additional 600 grams of hydrocarbon fuel to the gelled composition and retain the gelled fuel composition characteristics thereby providing a gelled fuel composition containing only a small proportion of polymer.

As demonstrated in the above examples the addition of treated bentonite clay to the gelled liquid hydrocarbon fuel compositions substantially improves those compositions in that more hydrocarbon liquid can be gelled with a smaller amount of polymer.

The bentonite clays in no way substantially alter the burning characteristics of the finished volatile gelled liquid fuel composition and in fact provide a means of on site gelling. That is to say, a dilute polymer-liquid hydrocarbon blend which is easily pumpable can be transported to the area of use and the treated bentonite clay then added to the dilute blend to bring about the proper gelled liquid hydrocarbon fuel consistency necessary for military firebomb and flamethrower applications.

The invention claimed is:

1. A gelled normally volatile fuel composition consisting essentially of a normally liquid volatile fuel containing 10–50 weight percent based on the final composition of a gelling agent consisting essentially of 50–90 weight percent atactic polypropylene and 10–50 weight percent organic base-coated bentonite clay.

2. A composition according to claim 1 wherein the gelling agent comprises 20 to 40 weight percent of the total composition.

3. A composition according to claim 1 wherein the normally liquid hydrocarbon comprises a mixture of liquid hydrocarbons which boil in the range of 80–650° F.

4. A composition according to claim 1 wherein the normally liquid hydrocarbon is gasoline.

References Cited

UNITED STATES PATENTS

| | | | |
|---|---|---|---|
| 2,885,360 | 5/1959 | Haden et al. | 44—7 X |
| 2,917,458 | 12/1959 | Morway et al. | 252—59 X |
| 3,084,033 | 4/1963 | Kelly et al. | 44—7 |
| 3,236,611 | 2/1966 | Behnke et al. | 44—7 |
| 3,336,121 | 8/1967 | Jacobson et al. | 44—7 |

DANIEL E. WYMAN, *Primary Examiner.*

CARL F. DEES, *Assistant Examiner.*